(12) United States Patent
Arndt et al.

(10) Patent No.: US 7,272,671 B2
(45) Date of Patent: Sep. 18, 2007

(54) MEANS OF CONTROL BITS PROTECTION IN A LOGICAL PARTITION ENVIRONMENT HAVING A FIRST AND SECOND DISTINCT OPERATING SYSTEM

(75) Inventors: Richard Louis Arndt, Austin, TX (US); Craig Henry Shempert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/624,286

(22) Filed: Jul. 22, 2003

(65) Prior Publication Data

US 2005/0177650 A1 Aug. 11, 2005

Related U.S. Application Data

(62) Division of application No. 09/714,732, filed on Nov. 16, 2000, now Pat. No. 6,751,679.

(51) Int. Cl.
*G06F 3/00* (2006.01)
(52) U.S. Cl. .............................. 710/23; 710/3; 710/31; 710/33; 710/104; 710/302; 710/306; 710/4; 711/151; 711/152; 711/153; 711/163; 711/165; 714/4; 714/10; 714/11
(58) Field of Classification Search .................... 710/3, 710/4, 23, 104, 306, 302, 31, 33; 711/151–153, 711/163, 165; 714/4, 10, 11
See application file for complete search history.

(56) References Cited

U.S. PATENT DOCUMENTS

| | | | |
|---|---|---|---|
| 5,345,590 A | 9/1994 | Ault et al. | 395/650 |
| 5,987,581 A | 11/1999 | Nale | 711/202 |
| 6,542,926 B2 * | 4/2003 | Zalewski et al. | 709/213 |
| 6,684,343 B1 * | 1/2004 | Bouchier et al. | 714/4 |
| 6,973,517 B1 * | 12/2005 | Golden et al. | 710/104 |
| 2002/0016891 A1 | 2/2002 | Noel et al. | 711/153 |

OTHER PUBLICATIONS

Teodosiu, "Hive: Fault Containment for Shared-Memory Multiprocessors", SOSP'95, Aug. 1995.*

* cited by examiner

*Primary Examiner*—Tammara Peyton
(74) *Attorney, Agent, or Firm*—Duke W. Yee; Diana R. Gerhardt; Theodore D. Fay, III (57) ABSTRACT

A method, system, and apparatus for secure programmable addressing is provided by relocating functions within a multifunctional chip to be distributed across multiple logical partitions and maintaining security over the distribution mechanism. In one embodiment, this invention is used by a data processing system including a system processor connected to a plurality of operating system instances that are allocated individual system functions. Using logical partitioning, each operating system instance's access is limited to its own partition. Address buses to system functions are manipulated to make the functions appear at appropriate memory locations expected by the operating system instances. Accordingly, an inverter can be inserted on the address bus to change the address to a given distance in memory safe from operating system accessibility, for example, a page boundary. The functions' control areas are moved to a secure area of memory while the functions are remapped to the normal address ranges expected by the operating system instance in the respective logical partition.

7 Claims, 7 Drawing Sheets

MEANS OF CONTROL BITS PROTECTION IN A LOGICAL PARTITION ENVIRONMENT HAVING A FIRST AND SECOND DISTINCT OPERATING SYSTEM

This application is a divisional of application Ser. No. 09/714,732, filed Nov. 16, 2000, status pending, which is herein incorporated by reference.

BACKGROUND OF THE INVENTION

1. Technical Field

The present invention relates generally to the field of computer architecture and, more specifically, to methods and systems for safekeeping distribution mechanism addressing.

2. Description of Related Art

This invention uses the super I/O chip, similar to that which is used in every PC and RS6000. These computer chips currently are multifunctional which means they have within their bounds or control multiple device functions that map to different places in memory. These chips may allow multiple operating system instances to run on the same hardware by using, for example, a logical partitioning option (LPAR).

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS running within the platform is protected from each such that software errors on one logical partition do not affect the correct operation of any of the other partitions. This is provided by allocating a disjoint set of platform resources to be directly managed by each OS image and by providing mechanisms for ensuring that the various images can not control any resources that have not been allocated to it. Furthermore, separate resources allocated to an OS image do not themselves affect the resources of any other image.

LPAR typically does not allow more than one operating system instance to use the same piece of hardware. However, in some systems, device resources in a multifunctional device must be split between multiple logical partitions. To access each piece of hardware, control bits are used. These control bits are generally in address proximity to the devices themselves. An errant process could write over control bits and affect other operating systems negatively that expect to find hardware in a given location. Any image of an OS that is able to use that OS's hardware and functions has the ability to tamper with the identification of the location of the hardware or functions. Thus, an errant operation from one image of an operating system could corrupt available functions by making them inaccessible to other images. Thus, each image of the OS (or each different OS) may directly access the distribution mechanism for a multifunctional system's functions.

Currently, in both LPAR systems and non-partitioned systems, when a function is not locatable, it has become unusable to every image of an operating system. It is undesirable for an error in one operating system instance to cause an error in another operating system instance.

The only solution has been for the operating system to perform a complete shutdown of the system, and rely on a service processor to initialize and reallocate the addresses of functions to each operating system. The user is forced to wait through a reboot of the system each time any function's addressing is corrupted. Such a requirement may not be terribly problematic for users with a simple configuration in which a reboot is relatively quick or for users in which having the system available at all times is not critical. However, for other users with complex configurations, such as, for example, multiple racks of serial storage architecture (SSA) or networked systems, a considerable amount of time will be spent rebooting the system just to replace or reinitialize functions' addressing. Such expenditure of time may be very costly for those users. For example, if the system is a web server critical for taking internet sales orders for products, such as, for example, books or compact disks (CDs), each minute of time that the system is shut down to replace a bad I/O adapter may result in many thousands of dollars in lost sales. Therefore, a method and system for safeguarding the addressing of the functions allocated to each operating system without the need for powering down or rebooting the system would be desirable.

SUMMARY OF THE INVENTION

The present invention provides a method, system, and apparatus of secure programmable addressing by relocating functions within a multifunctional chip to be distributed across multiple logical partitions and maintaining security over the distribution mechanism. In one embodiment, this invention is used by a data processing system including a system processor connected to a plurality of operating system instances that are allocated individual system functions. Using logical partitioning, each operating system's access is limited to its own partition. Address buses to system functions are manipulated to make the functions appear at appropriate memory locations expected by the operating systems. Accordingly, an inverter can be inserted on the address bus to change the address to a given distance in memory safe from operating system accessibility, for example, over a page boundary. The control areas for the functions are moved to a secure area of memory while the functions are remapped to the normal address ranges expected by the operating system in the respective logical partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
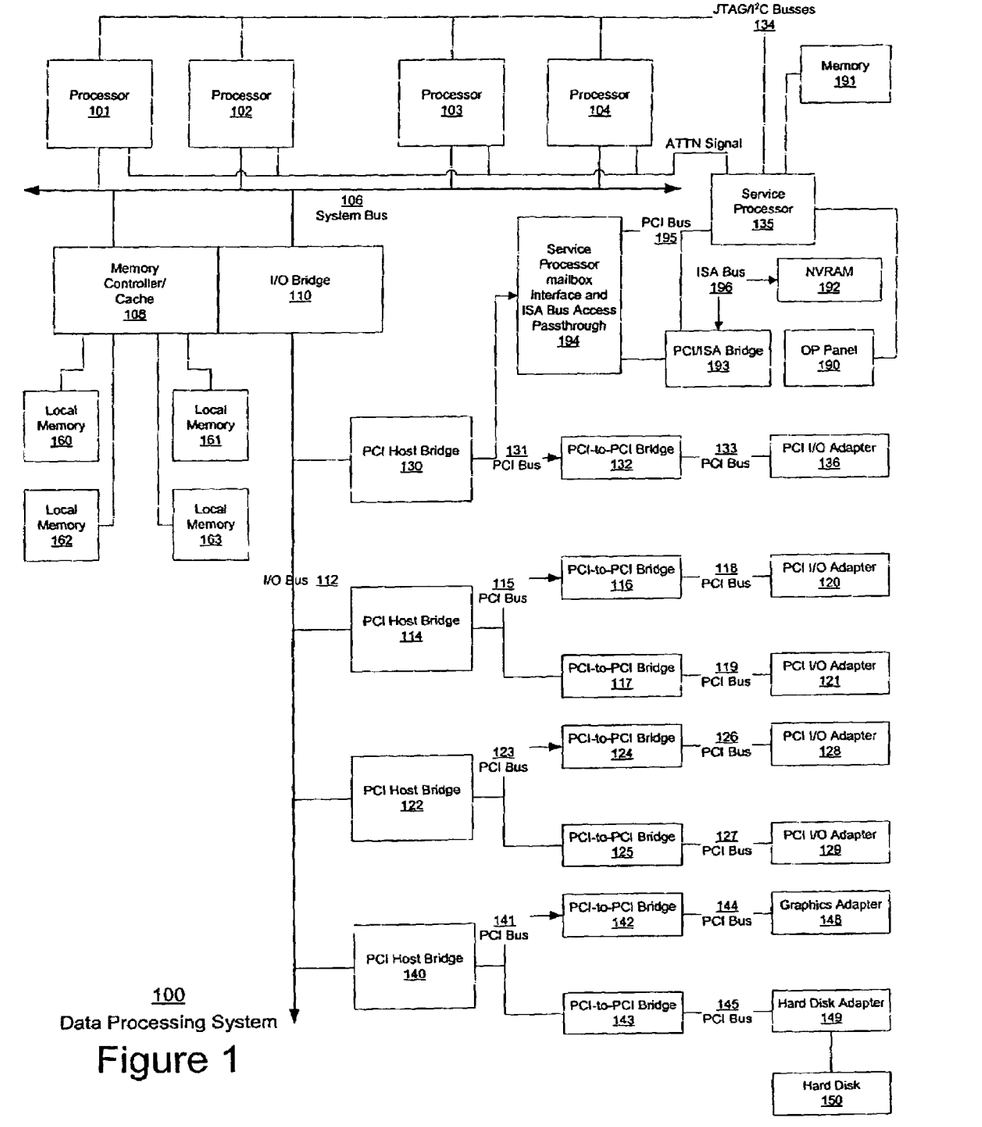
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted. An operating system, such as, for example, the Advanced Interactive Executive (AIX) operating system, a product of the International Business Machines Corporation of Armonk, N.Y., may run on data processing system 100.

Peripheral component interconnect (PCI) Host bridge 114 connected to I/O bus 112 provides an interface to PCI local bus 115. A number of Input/Output adapters 120-121 may be connected to PCI bus 115 through a respective one of PCI-to-PCI bridges 116-117 via a respective one of PCI buses 118-119. Typical PCI bus implementations will support between four and eight I/O adapters (i.e. expansion slots for add-in connectors). Each I/O Adapter 120-121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI-to-PCI bridges 124-125 which are in turn each connected to a respective one of PCI I/O adapters 128-129 by a respective one of PCI buses 126-127. Thus, additional I/O devices, such as, for example, modems or network adapters may be supported through each of PCI I/O adapters 128-129. In this manner, data processing system 100 allows connections to multiple network computers. Each of PCI-to-PCI bridges 116-117, 124-125, 142-143, and 132 is connected to a single I/O adapter.

A memory mapped graphics adapter 148 may be connected to I/O bus 112 through PCI Host Bridge 140 and PCI-to-PCI Bridge 142 via PCI buses 141 and 144 as depicted. A hard disk 150 may also be connected to I/O bus 112 through PCI Host Bridge 140 and PCI-to-PCI Bridge 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access passthrough logic 194 and PCI-to-PCI Bridge 132. The ISA bus access passthrough logic 194 forwards PCI accesses destined to the PCI/ISA bridge 193. The NV-RAM storage is connected to the ISA bus 196. The service processor 135 is coupled to the service processor mailbox interface 194 through its local PCI bus 195.

Service processor 135 is also connected to processors 101-104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. Service processor 135 is responsible for saving and reporting error information related to all the monitored items in data processing system 100. Service processor 135 also takes action based on the type of errors and defined thresholds.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
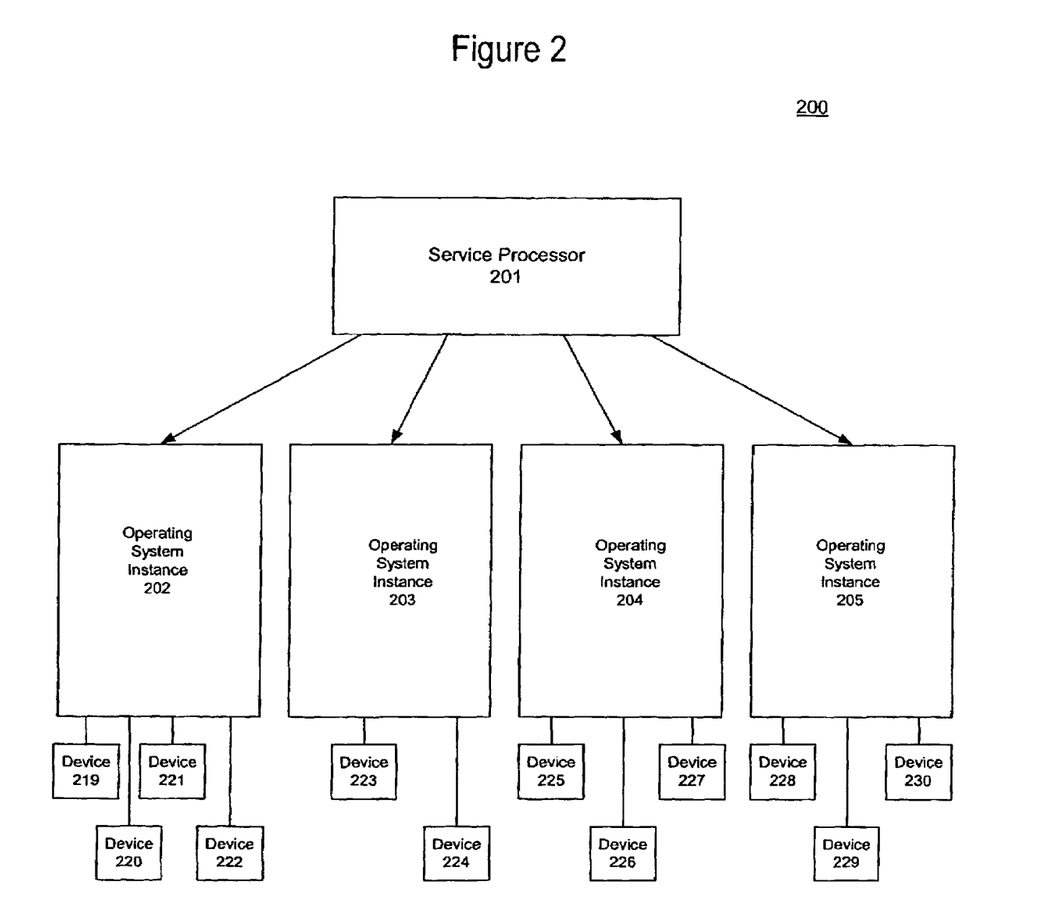
FIG. 2 depicts a block diagram illustrating the interaction between a service processor and multiple operating systems within a data processing system in accordance with the present invention.

With reference now to FIG. 2, a block diagram illustrating the interaction between a service processor and multiple operating systems within a data processing system is depicted in accordance with the present invention. Data processing system 200 may be implemented as, for example, data processing system 100 in FIG. 1. Service processor 201 may be implemented as, for example, service processor 135 in FIG. 1. Service processor 201 initializes data processing system 200, comprising multiple operating system instances 202-205. Service processor 201 initializes and loads each operating system instance 202-205 into memory, and monitors the system. When any processor stops, service processor 201 interrogates it. Service processor 201 also manages fans to maintain temperature of the data processing system 200. Service processor 201 does not access devices 219-230. Service processor 201 is not necessarily required for data processing system 200; instead, service processor 201 could be a switch, a well-behaved or privileged copy of an operating system, or an extraneous control system. In this embodiment, it is a service processor that initializes the system 200, then transfers control to each operating system instance 202-205 which have access to their respective collection from devices 219-230. The number of operating system instances 202-205 may vary from zero to an upper limit restricted only by the data processing system 200's particular requirements.

This embodiment arranges the operating system instances 202-205 using logical partitioning. Within an LPAR system, an operating system instance such as operating system instance 202 has access to certain functions but does not share those functions among the rest of the operating system instances 203-205. In this embodiment, an example of a function to which an operating system instance 202-205 has access is a device, such as devices 219-230. Each single device 219-230 is shared exclusively among its allocated multiple operating system instances 202-205. Operating system instance 202 has exclusive access to devices 219-222; operating system instance 203 has exclusive access to devices 223 and 224; operating system instance 204 has exclusive access to devices 225-227; and operating system instance 205 has exclusive access to devices 228-230.

Figure 3:
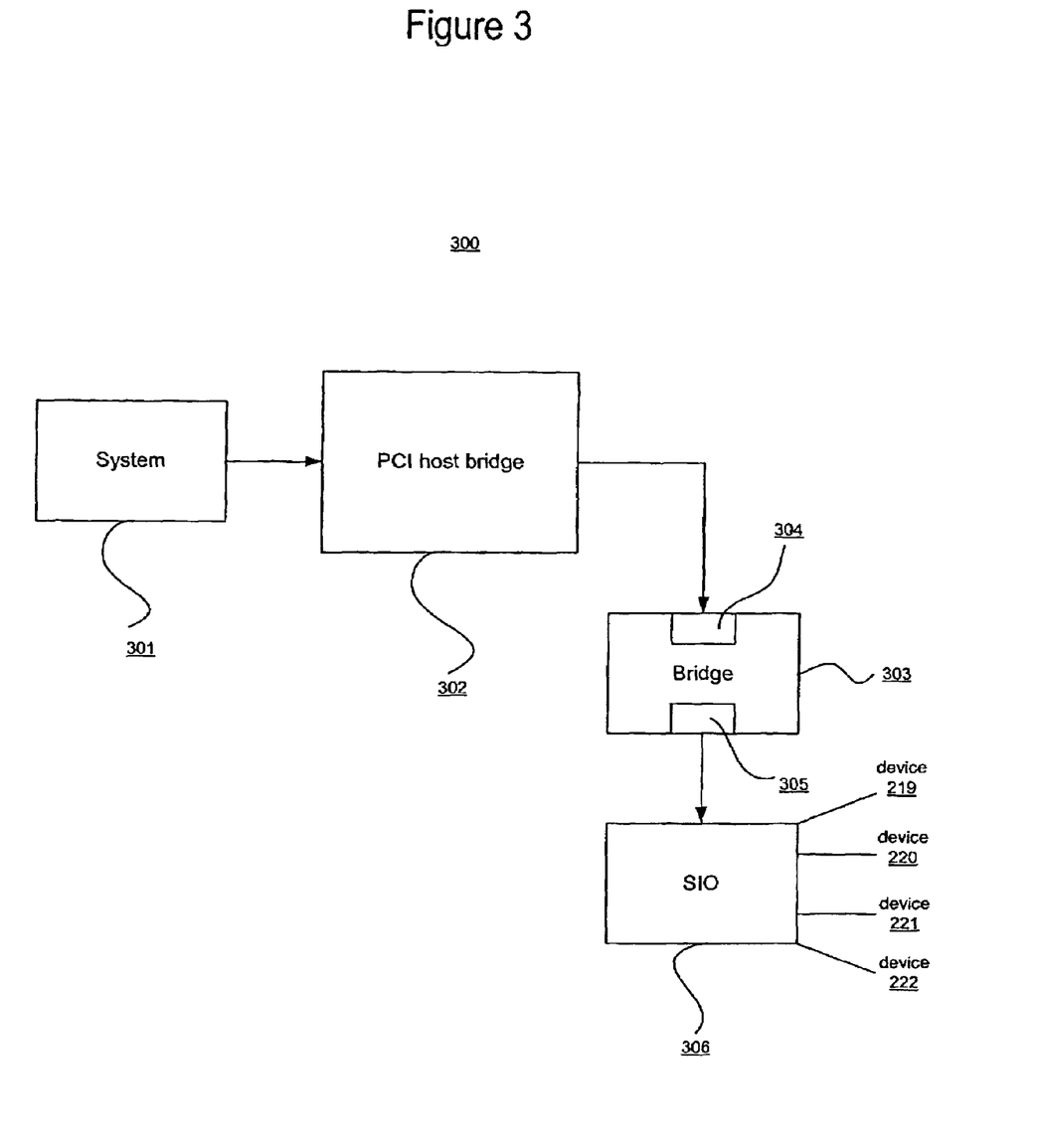
FIG. 3 depicts a block diagram of a connection of a data processing system service processor to operating systems in accordance with the present invention.
Figure 4:
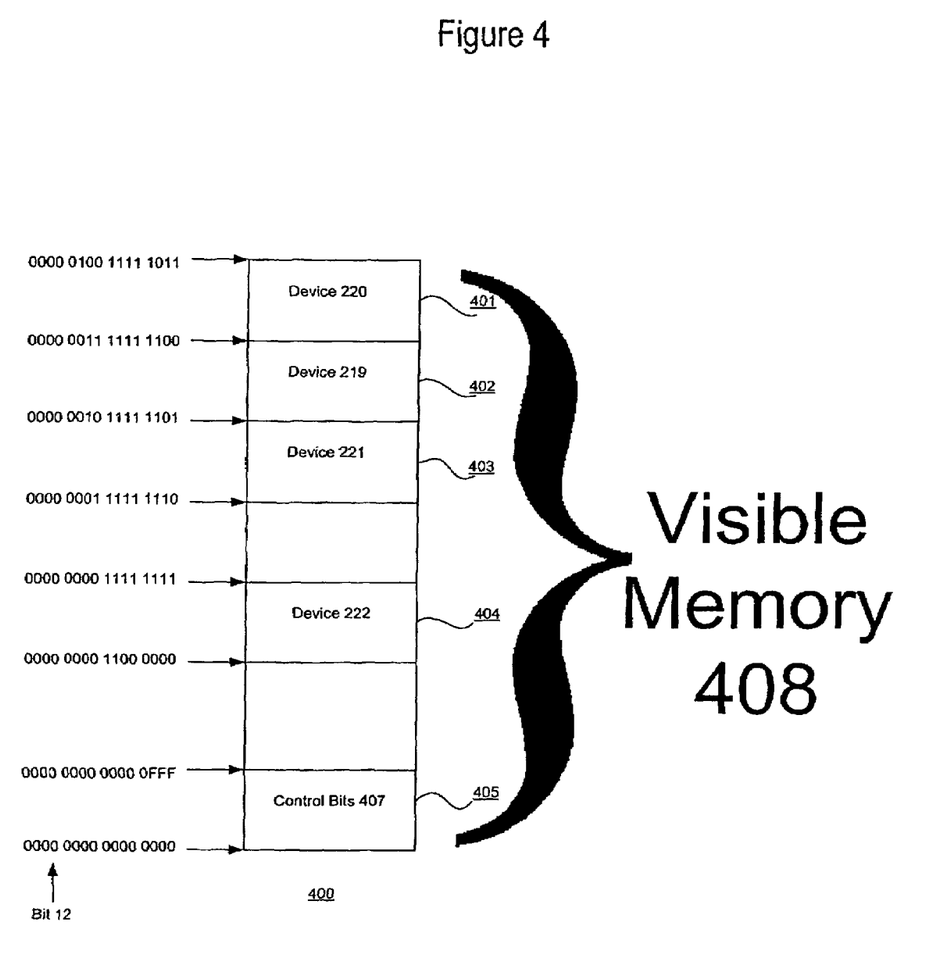
FIG. 4 depicts an example memory map of visible memory space in accordance with the prior art.

With reference now to FIG. 3, a block diagram of a connection of a data processing system service processor to operating systems is depicted in accordance with the present invention. System service processor 301 may be implemented as, for example, service processor 201 in FIG. 2. In this embodiment, a PCI host bridge 302 is used to connect the service processor system 301 to the storage facilities of any of operating system instances, such as, for example, operating system instances 202-205 in FIG. 2. The PCI host bridge connects to bridge 303. Bridge 303's connections 304 and 305 both contain base address registers which indicates where devices 219-222 addresses reside, as depicted in FIG. 4. The base address register stores the devices' beginning address location in memory and the full size of the operating system instance's space available to it in memory. These values are important in order that the control bits may be moved past that starting location by at least a given size.

With reference now to FIG. 4, an example memory map of visible memory space is depicted in accordance with the prior art. The area delineated by base address register contained in connections 304 and 305 is all visible to the operating system instance for which it is defining visible memory space. Memory map 400 contains address areas 401-404 for each of operating system instance 202's devices 219-222. Address area 405 is a storage area that contains and designates address areas 401-404 of devices 219-222 and is called a distribution mechanism. In this embodiment, that storage area or distribution mechanism uses control bits 407 of the devices 219-222. Each operating system instance 202-205 has access to a collection of stored addresses, such as, for example, control bits 407 in the case of operating system instance 202.

Therefore, one operating system instance 202, for example, could thwart accessibility of device 222 and prevent all operating system instances 202-205 from using device 222 until the service processor 201 reinitializes the device 222's address and restores that addressing knowledge to operating system instance 202. In the prior art, service processor 201 restores knowledge by writing device 222's address over any corrupted area of control bits 407.

Figure 5:
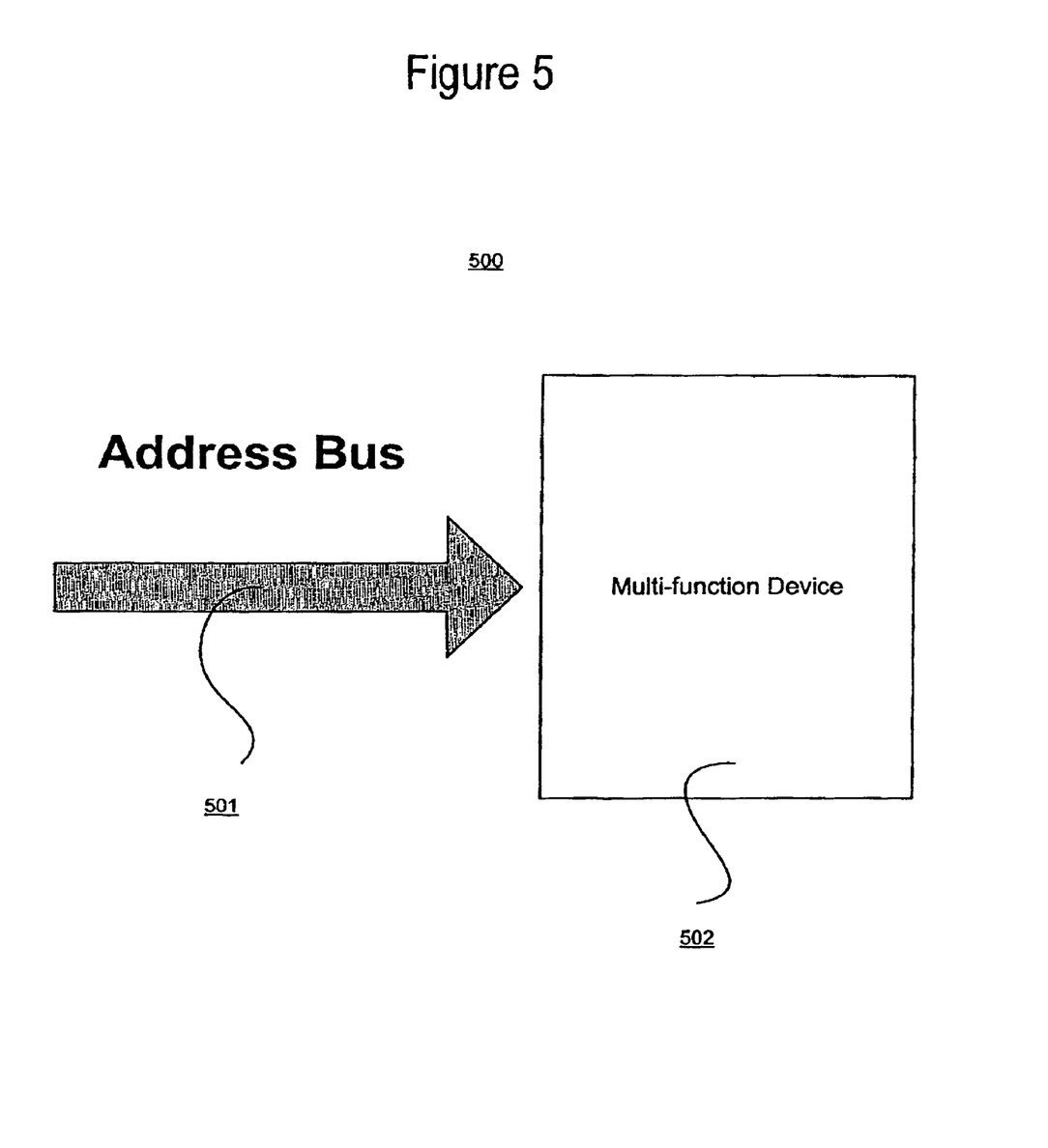
FIG. 5 depicts a typical path of an address bus to a multifunctional device in accordance with the prior art.

FIG. 5 depicts a typical path of an address bus to a multifunctional device in accordance with the prior art. Addresses stored in control bits 407 are sent over an address bus 501 as illustrated in FIG. 5 without change to multifunctional device 502. The address bus carries device addresses to the multifunctional device without altering the addresses. Multiple operating systems are able to access one entity and a multi-functional device is split among them. Thus, all operating system instances have direct access to alter each device's control bits so that no instance can use the device until service processor 201 reboots the system.

Figure 6:
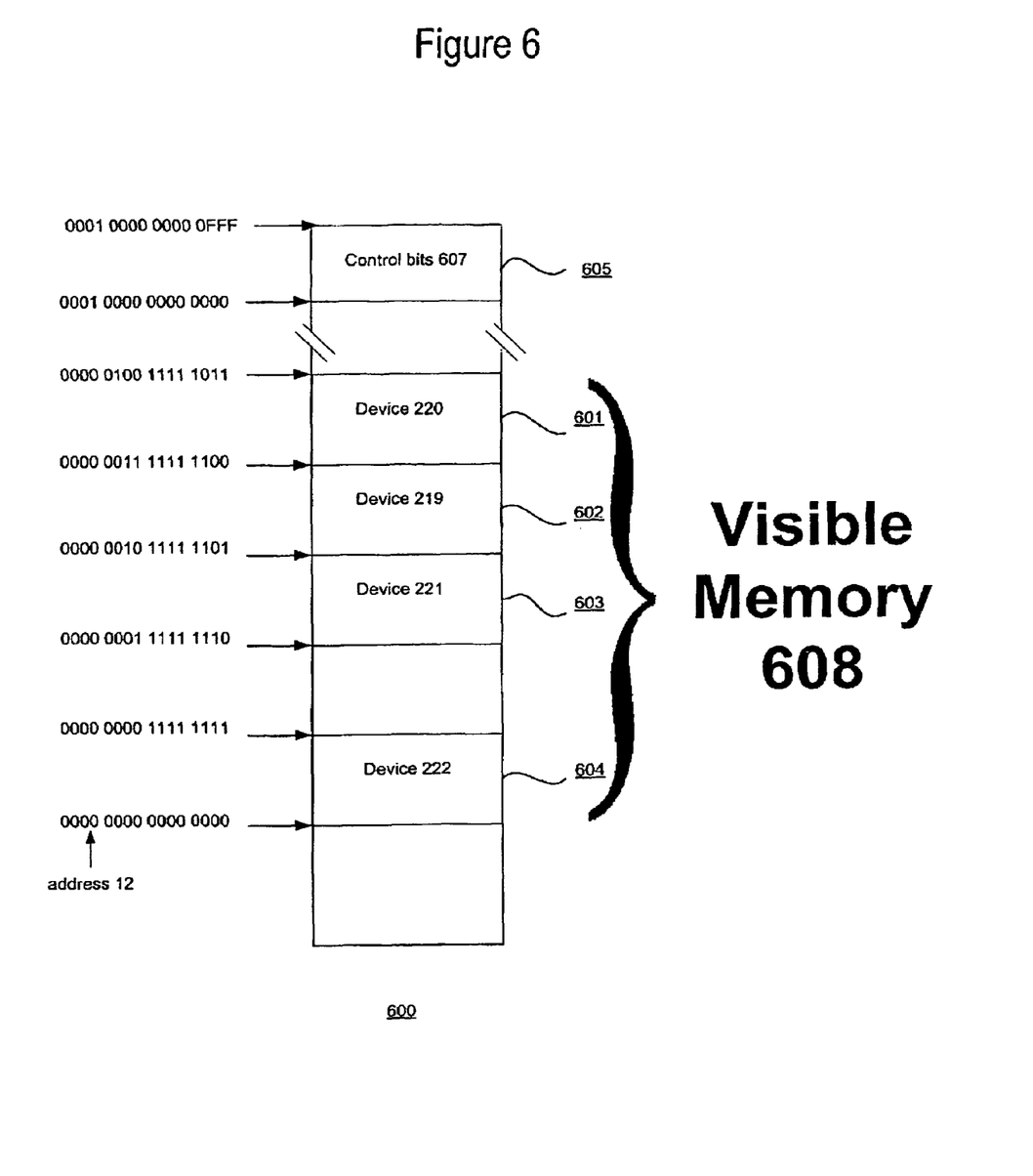
FIG. 6 depicts an example memory map of visible memory space to a system employing this invention's addressing method in accordance with the present invention.

With reference now to FIG. 6, an example memory map of visible memory space to a system employing this invention's addressing method is depicted in accordance with the present invention. As shown in FIG. 6, this invention changes visible memory 408 of FIG. 4 to visible memory 608 of FIG. 6. The difference is operating system instance 202 can no longer access control bits 607, which store addresses for its devices 219-222. Each of the other operating system instances 203-205 share a similar visible memory 608 as FIG. 6. To safeguard devices from being lost by operating system instances 202-205 in a multifunctional environment, the control bits 407 are moved outside of a range visible to any other instance of 202-205. Control bits and devices are accessible in the same memory map only for initialization, but it is initialization by service processor that inverts chosen address bits.

In the prior art, operating system instance 202 had access to each memory location within address areas 401-404 of its allocated size stored in its base address register contained in connection 304 and 305 in FIG. 3. In one embodiment, the allocated size of each operating system instance is assumed to be a page, or 4096 bits, but each operating system instance's allocated memory does not necessarily have to measure 4096 bits or even be equivalent.

Figure 7:
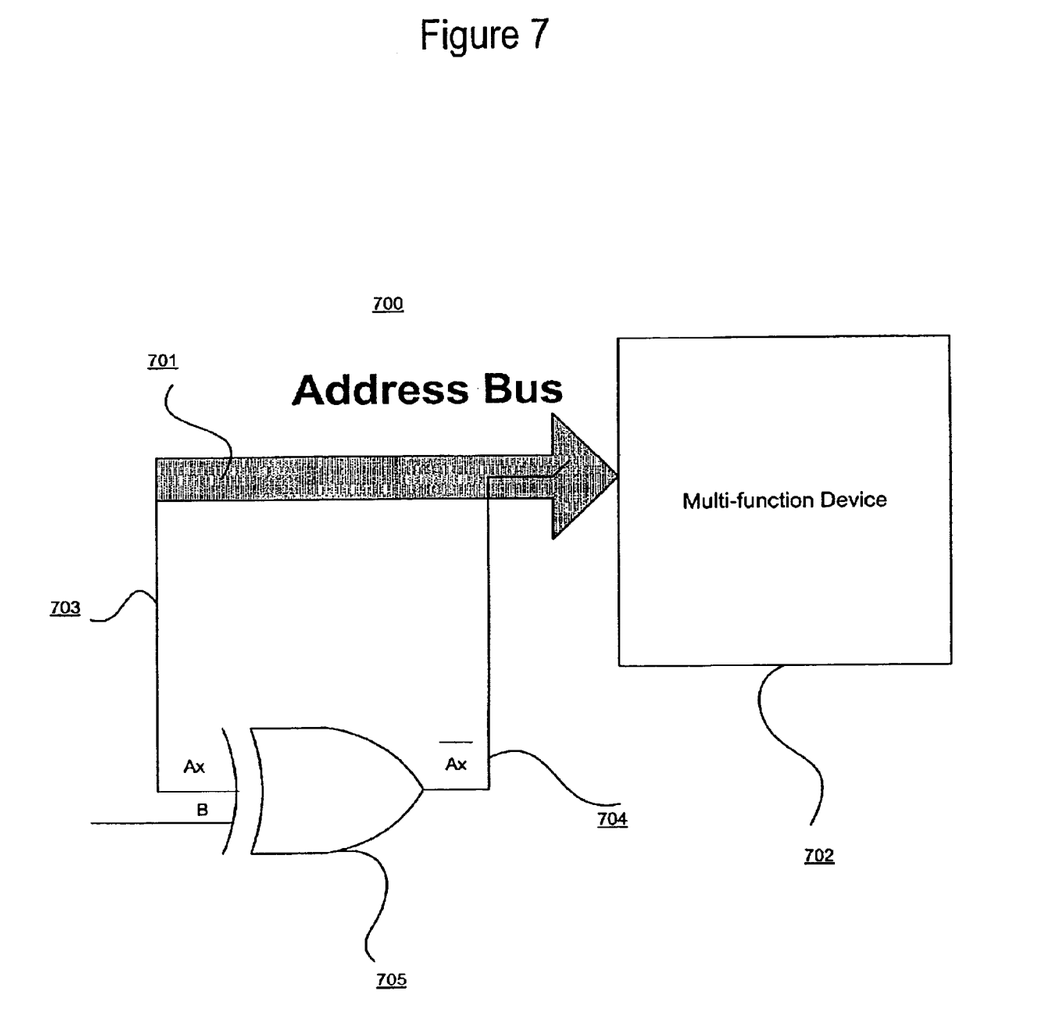
FIG. 7 depicts a block diagram of a path of an address bus to a multifunctional device in accordance with the present invention.

With reference now to FIG. 7, a block diagram of the path of address bus 701 to multifunctional device 702, is depicted in accordance with the present invention. Ax represents a number of address bits that have been chosen to be inverted. B represents the enabler for exclusive-or gate 705. Inverting Address bit or bits Ax with signal B disallows all operating system instances to access control bits. Axbar represents Ax inverted and the line 704 represents Axbar aligned back into the address bits on the address bus to the multifunction device. The control bits 407 are modified to match inverted address bit or bits Ax and the operating system instance will send the same address to search for the devices as originally expected.

In this embodiment, the address of device 219 of operating system instance 202 is being sent across address bus 701. One bit Ax is sent through inverter 705 to become Axbar. Inverters, such as, for example inverter 705, are on address bus 701 before chip select that is 3 or 4 bits to the chip itself. Inverter 705 is an exclusive-or gate. The exclusive-or gate compares the bit to the enable signal B, '1,' which serves in a similar manner as a not gate. After exiting inverter 705, Axbar is rejoined with other address bits sent across address bus 701 to identify device 219's location in multifunction device 702.

More inverters, such as, for example, inverter 705, may branch off of address bus 701 to invert other bits, if desired, as long as the final address with inverted bits falls outside of the visible area of the operating system instance to protect devices' control bits from errors in other operating system instances. For example, a page size is 4096 bits or $2^{12}$, which requires 12 address bits. A device's mapping, such as FIG. 4, is where operating system instances expect to find that device. If, for example, each operating system instance's range is a page size, inverting a control bit out of the page size renders the operating system instance unable to access the area in which the device now supposedly is.

Everything associated with instances of operating systems that are controllable through an interface such as a serial port, USB infrared port, Ethernet, an Industry Standard Architecture bus, nonvolatile memory, and just about any other I/O function as the communication with the operating system as its system console. Serial ports are the basic communication with the operating system instance is this described embodiment. In this described embodiment, four ASYNC asynchronous communications ports are used.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

What is claimed is:

1. A data processing system with programmable addressing, comprising: at least one multifunctional input/output device operating in a logical partition environment, wherein the logical partition environment comprises a first operating system and a second operating system distinct from the first operating system;
   a memory coupled to the at least one multifunctional input/output device, wherein the memory contains a first set of control bits, wherein the first set of control bits allocate a first function of the multifunctional input/output devices into a first memory location of the memory, and wherein the first function is assigned to the first operating system;
   an address bus coupled to the at least one muitifunctional input/output device, wherein the address bus allows transmission of the control bits between the at least one multifunctional input/output device and the memory; and
   a programmable address control coupled to the address bus, wherein the programmable address control relocates the first set of control bits from the first memory location to a second memory location in the memory, and wherein the second memory location is inaccessible to the first operating system.

2. The data processing system of claim 1, wherein the programmable address control remaps the first function to normal address ranges expected by the first operating system.

3. The data processing system of claim 1, wherein the programmable address control maintains security.

4. The data processing system of claim 1, wherein the programmable address control relocates the first set of control bits by inverting the first set of control bits.

5. The data processing system of claim 4, wherein inverting the first set of control bits is performed by an inverter coupled to the address bus.

6. The data processing system of claim 5, wherein the inverter is programmable and may be changed based on any operating system environment and frequency of initialization.

7. The data processing system of claim 1, wherein the multifunctional input/output device comprises one of a modem, a serial port, USB infrared port, and a network adapter.

\* \* \* \* \*